United States Patent [19]

Weiss

[11] Patent Number: 5,691,981
[45] Date of Patent: Nov. 25, 1997

[54] METHOD AND APPARATUS FOR PROVIDING ROAMING INSTRUCTIONS TO DATA COMMUNICATION RECEIVERS

[75] Inventor: Karl Robert Weiss, Singapore, Singapore

[73] Assignee: Motorola, Inc., Schaumburg, Ill.

[21] Appl. No.: 584,666

[22] Filed: Jan. 11, 1996

[51] Int. Cl.$^6$ ........................................................ H04J 3/16
[52] U.S. Cl. ........................... 370/329; 370/349; 370/59; 455/33.1
[58] Field of Search ............................... 370/95.1, 95.2, 370/95.3, 310, 312, 314, 319, 321, 322, 326, 329, 331, 336, 337, 341, 346, 349, 389, 395, 442; 379/59, 60, 58; 455/33.1–32.4, 56.1, 54.1

[56] References Cited

U.S. PATENT DOCUMENTS

5,359,603  10/1994  McTiffin ................................ 370/95.1
5,539,744  7/1996  Chu et al. ............................... 370/95.1

*Primary Examiner*—Dang Ton
*Attorney, Agent, or Firm*—Pablo Meles

[57] ABSTRACT

A communication system (105) provides roaming instructions within a signal having frames of data. The communication system (105) includes a message transmission device (110) for batching information into a frame of data and transmitting, within a predetermined geographic area, the information on a radio communication channel. The frame includes at least frame offset information for reception by a data communication receiver (115) located within the predetermined geographic area for receiving the information. The data communication receiver (115) stores a base frame number associated with a base frame during which the data communication receiver (115) is assigned to wake for message reception. The frame offset information is indicative of a substitute frame that is relative to the base frame. The data communication receiver (115) is to wake for message reception thereafter in the substitute frame rather than the base frame.

20 Claims, 8 Drawing Sheets

FIG. 6
LOCAL SUB-SYSTEM
BASE FRAME NO. = 5
FOV = 0

FIG. 7
OVER-LAPPING SUB-
SYSTEM / FOV = 2

FIG. 8
OVER-LAPPING SUB-
SYSTEM / FOV = 6

FIG. 9
REMOTE SUB-
SYSTEM / FOV = 0

METHOD AND APPARATUS FOR PROVIDING ROAMING INSTRUCTIONS TO DATA COMMUNICATION RECEIVERS

FIELD OF THE INVENTION

This invention relates in general to communication systems that support roaming data communication receivers, and more specifically to the provision of roaming instructions to the data communication receivers.

BACKGROUND OF THE INVENTION

Data communication receivers, such a portable pagers, are carried by subscribers to receive information, such as selective call messages, within a specific coverage area associated with a local service provider. Because many people travel to various geographic areas, communication systems often support "roaming" data communication receivers. This is done by providing service to data communication receivers that have temporarily relocated to the coverage area of a different service provider. For example, a person may normally subscribe for service within a single city. However, he can still receive selective call service when traveling to different cities or countries as long as the service providers in those locations support roaming.

Some conventional data communication receivers scan different radio channels to determine which channel is the correct one on which to receive messages in a roaming environment. A roaming data communication receiver can, for example, wake from conventional battery saving to receive information on a channel that has a relatively strong signal strength. When the received channel is not the correct one, the data communication receiver can continue to scan other channels until the correct one is located, such as by detecting the presence of identification information recognized by the data communication receiver. However, prior art data communication receivers generally wake for message reception only during assigned frames of a radio frequency signal. Therefore, when a data communication receiver wakes during its assigned frame and does not locate the identification information on a first radio channel, it does not again awake for message reception on a second radio channel until time for another assigned frame. As a result, location of the correct channel can be very time consuming since the assigned frames usually occur only periodically. Furthermore, during the time in which the data communication receiver is scanning for the correct channel, messages intended for reception by the data communication receiver can be missed entirely.

Thus, what is needed is an improved method and apparatus for providing system instructions to a roaming data communication receiver.

DESCRIPTION OF A PREFERRED EMBODIMENT

Figure 1:
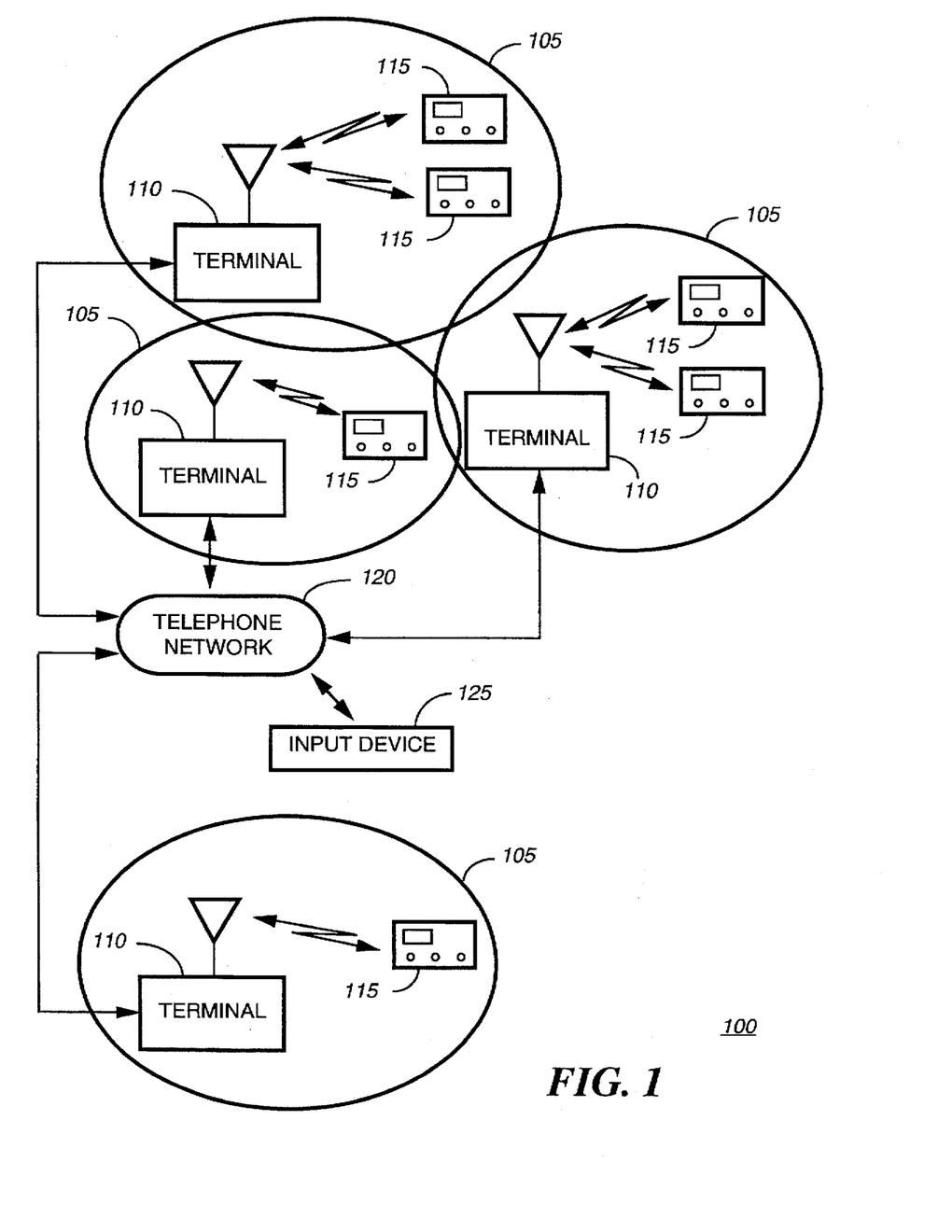
FIG. 1 is an illustration of a communication system including sub-systems that support roaming in accordance with the present invention.

FIG. 1 is an electrical block diagram of a communication system 100 in which different service providers provide communication services within a plurality of communication sub-systems 105, each defined by a predetermined geographic area in which messages are transmitted. Each communication sub-system 105 comprises at least one message transmission device, such as a terminal 110, for transmitting information, e.g., selective call messages, over the air as radio signals. As shown in FIG. 1, both overlapping and remote communication sub-systems 105 can be included in the communication system 100.

The signals transmitted by a given service provider are received by data communication receivers 115 within the coverage area of the provider. Each data communication receiver 115 is generally associated with a local communication sub-system 105 in which messages are normally transmitted to the data communication receiver 115. The data communication receiver 115 can, however, roam into other communication sub-systems 105 and receive messages in the geographic areas associated therewith.

Messages intended for reception by a data communication receiver 115 are usually provided to its home terminal via a telephone system 120, such as the Public Switched Telephone Network. It will be appreciated, though, that messages could additionally or alternatively be received via dedicated wireline communication links, radio links, or even direct access to a terminal 110 through a data entry device. When the telephone system 120 is used for providing message information to a terminal 110, messages can be originated using an input device 125 such as a personal computer and modem or a conventional telephone. The terminal 110 transmits the message to the recipient data communication receiver 115 or, when the data communication receiver 115 has roamed into a different sub-system 105, forwards the message to the terminal 110 associated with the sub-system 105 into which the data communication receiver 115 has roamed. Alternatively, message originators could provide a message directly to a terminal 110 associated with a sub-system 105 into which the recipient data communication receiver 115 has roamed.

Figures 2, 3:
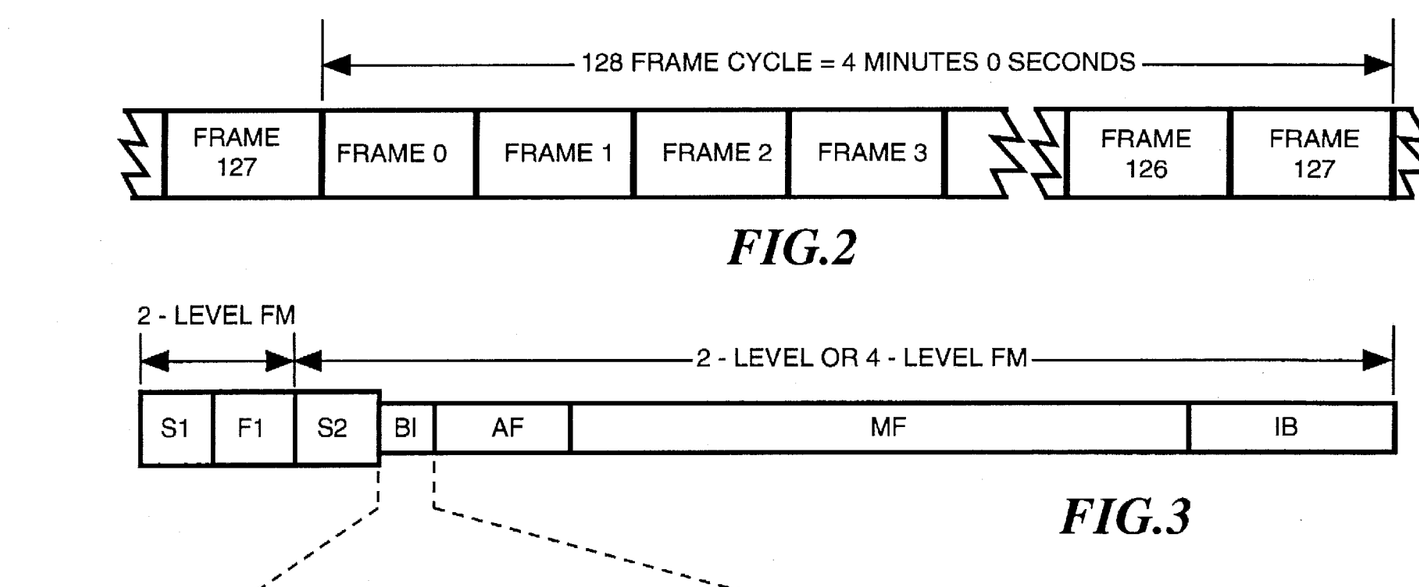
FIGS. 2–4 are signal diagrams of signals that include frequency offset information and that are transmitted in the communication system of FIG. 1 in accordance with the present invention.
Figure 4:
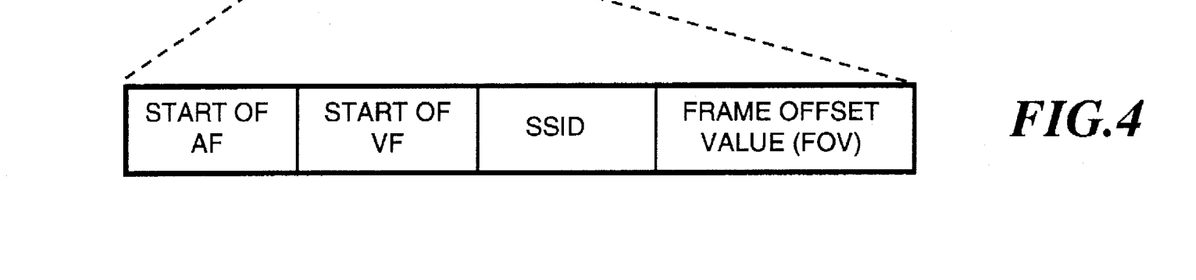

Referring to FIGS. 2–4, examples of signals provided within the communication sub-systems 105 are depicted. Preferably, as shown in FIG. 2, a radio frequency (RF) signal transmitted by a terminal 110 comprises periodic cycles of one-hundred-twenty-eight (128) frames, each frame numbered "zero" (0) to "one-hundred-twenty-seven" (127). The frames are transmitted at thirty-two frames per minute, and thus a full 128 frame cycle lasts four minutes. One hour is divided into fifteen cycles numbered "zero" (0) through "fourteen" (14). Frame 0 is synchronized to the start of each hour so that a data communication receiver 115 can derive real time information from the current frame and cycle number, thus providing the data communication receiver 115 with accurate time information.

Moreover, the protocol supports multiple time division multiplexed "phases", wherein, for example, a 6,400 bits per second (bps) data stream is time division multiplexed into four data streams of 1,600 bps. Such a signalling structure is disclosed in commonly assigned U.S. Pat. No. 5,168,493, which is hereby incorporated by reference. The general frame structure shown in FIG. 1 for the single phase shown is the same throughout each of the four phases.

Each frame comprises a synchronization (sync) portion and several blocks. The sync portion further comprises a Sync 1 portion (S1), a frame information (FI) work, and a Sync 2 portion (S2).

Each data communication receiver 115 is assigned a base frame in the set of 128 frames appearing on an RF channel. A data communication receiver 115 can trade battery life for the more frequent delivery of messages by being assigned to monitor more than one frame per cycle. Once a data communication receiver 115 acquires synchronization to the RF channel, it expects to find its assigned frame within a very tight time window. The use of 4-level frequency modulation (FM) doubles the data transmission rate per symbol (as compared to 2-level FM), which helps to reduce the effect of simulcast distribution errors and the effect of propagation timing differences between multiple signals within the capture range of the data communication receiver 115.

As shown in FIG. 3, the S1 portion of each frame provides for frame timing and symbol timing and indicates the speed of the remainder of the frame. The FI word carries eleven bits for the frame and cycle numbers, five bits for indication of the time division multiples phase of low traffic, one bit to indicate the presence of a frequency supporting network-wide roaming service, and other information. The S2 portion provides for synchronization at the frame's block speed to allow for proper demultiplexing and decoding of the blocks.

The block information field (BI), which follows sync, comprises a predetermined number of words including frame structure information such as roaming instructions. An address field (AF) follows the block information and consists of addresses of data communication receivers 115 targeted for message reception. A succeeding vector field (VF) directs addressed data communication receivers 115 to the appropriate message included in a message field (MF) following the vector field. IB represents idle blocks which are unused and are filled with appropriate bit patterns.

FIG. 4 depicts the block information in greater detail. The block information included bits that indicate the start of the address field and bits that indicate the start of the vector field. The block information of the frames further can include a simulcast system identification (SSID) or any other channel identifier that is capable of identifying the communication sub-system 105. Roaming instructions in the form of frame offset information are also provided. The SSID comprises several identifiers such as a local ID, a zone, a country code, a frequency, and other information (not shown). Preferably, the AF and VF start indicators are included in a first word, the SSID is included in a second word, and the FOV is included in a third word. Data communication receivers 115 that are to receive information in more than one communication sub-system 105 store multiple SSIDs, each unique to a communication sub-system 105. The frame offset information is indicative of a substitute frame that is to be treated as the base frame of a roaming data communication receiver 115. Preferably, the frame offset information comprises a frame offset value (FOV) that can be an integer value and that a roaming data communication receiver 115 adds to the number of its base frame to compute a substitute frame.

The SSID and FOV can, according to the present invention, be transmitted in each frame. Alternatively, the SSID and FOV could be transmitted only in selected frames known to data communication receivers 115 within the communication system 100. Preferably, the FOV should be transmitted within the same frames as the SSID. Also, although the SSID and FOV are described as located in the block information, other fixed locations known to data communication receivers 115 could instead be used for placement of the SSID and FOV. Furthermore, there is no requirement that both be transmitted at the same times or in the same locations.

Figure 5:
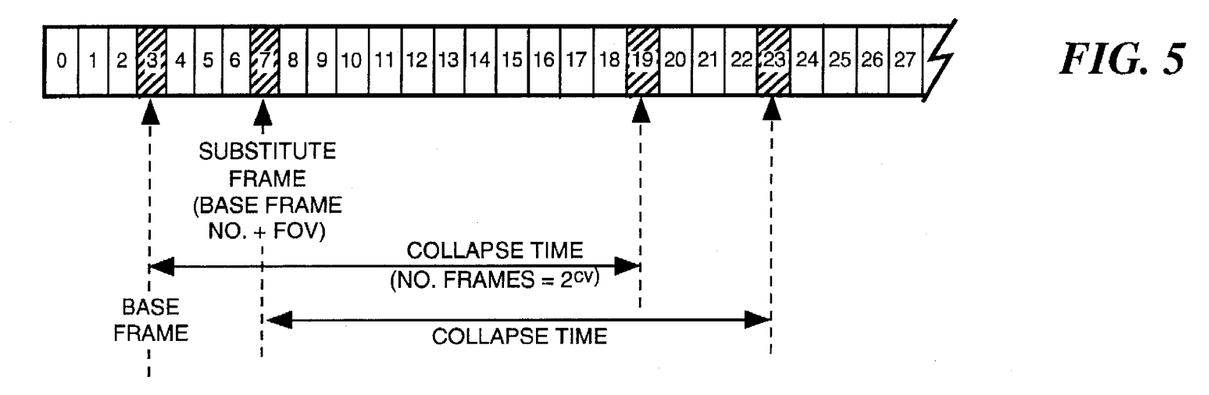
FIGS. 5–9 are signal diagrams depicting the battery saving cycles of a roaming data communication receiver of FIG. 1 that has received frequency offset information in accordance with the present invention.

Referring next to FIG. 5, a signal diagram depicts use of the FOV by roaming data communication receivers 115 according to the present invention. In some conventional signalling systems, such as one utilizing the well known FLEX™ signalling protocol, data communication receivers are assigned a base frame in which messages can be received. A data communication receiver generally receives its messages in the base frame or at recurring intervals, the time of which is determined by a collapse value that can be system-wide or specific to given data communication receivers. The collapse value is in the form of an integer and defines a collapse cycle that includes a number of frames given by the following equation:

$$\#F_{cc} = 2^{cv}, \tag{1}$$

where $\#F_{cc}$ denotes the number of frames per collapse cycle, and where cv denotes the collapse value.

In conventional FLEX™ systems, the data communication receiver wakes from conventional battery saving to receive messages when the following formula is satisfied:

$$\frac{\text{modulo } 2^{cv} \text{ (Base Frame No.)}}{\text{modulo } 2^{cv} \text{ (Receive Frame No.)}} = 1. \tag{2}$$

Implementation of the modulo function results in a remainder value. Specifically, the numerator of equation (2) yields the remainder of the base frame number divided by $2^{cv}$. The denominator of the equation yields the remainder of the receive frame number divided by $2^{cv}$. When the division of the numerator by the denominator equals "one" (1), the frame is received by the data communication receiver.

When, as shown in FIG. 5, the base frame number of a data communication receiver 115 is "three" (3), the data communication receiver 115 normally wakes in Frame 3. The data communication receiver 115 also wakes up in the nineteenth frame and will continue to wake every $2^{cv}$ frames thereafter. When, for instance, cv=4, the data communication receiver 115 will wake every sixteen (16) frames. In other words, the data communication receiver 115 will wake in the base frame and multiples thereof as indicated by the collapse cycle.

According to the present invention, the FOV modifies the operation of roaming data communication receivers 115, which use the FOV to compute a substitute frame that is thereafter treated as if it were the base frame. Preferably, the number associated with the substitute frame is given by the formula:

$$\text{Sub. Frame No.} = \text{Base Frame No.} + \text{FOV}. \tag{3}$$

Figure 6:
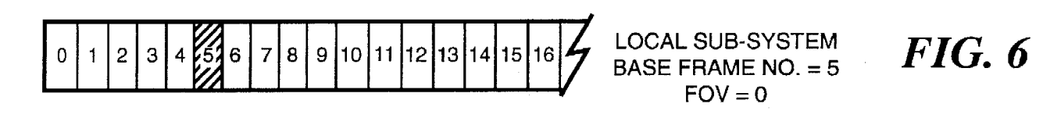
Figure 7:
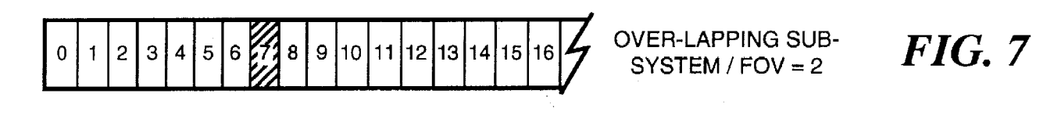
Figure 8:
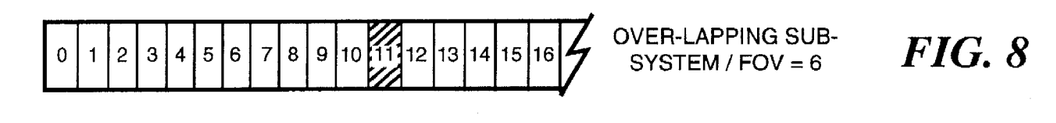
Figure 9:
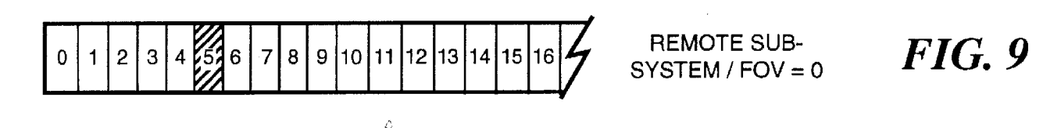

Referring next to FIGS. 6–9, signal diagrams show the enabling of a receiving circuit, as depicted by the shaded frames, within a data communication receiver 115 in a roaming environment. FIG. 6 illustrates the waking of the data communication receiver 115 in its local sub-system 105, i.e., the sub-system 105 in which it normally receives messages. In the local sub-system 105, the data communication receiver 115 receives information transmitted in its base frame in each cycle of the signal. Alternatively, the local data communication receiver 115 can use the FOV of the local sub-system 105 when it has roaming capabilities. In FIG. 6, for example, an FOV of "zero" (0) results in reception of the base frame and multiples thereof. Additionally, the data communication receiver 115 periodically wakes in other frames given by the collapse value. When, as shown in FIGS. 7–9, the data communication receiver 115 roams into another sub-system 105, it receives the FOV transmitted within that sub-system 105 and computes the number associated with the substitute frame that it is to use for message reception within the sub-system 105. In other words, the data communication receiver 115 computes the substitute frame number as a function of the FOV and its assigned base frame number. Thereafter, within that sub-system 105, the data communication receiver 115 treats the substitute frame as if it were the base frame.

In FIG. 7, the data communication receiver 115 roams into a sub-system 105 in which the FOV=2. Therefore, the substitute frame number is determined to be Frame 7, and the data communication receiver 115 wakes, in each cycle of the signal, in Frame 7 and in frames separated from Frame 7 by the collapse cycle. When the data communication receiver 115 roams into another sub-system 105, another FOV is received and used to compute another substitute frame number. For example, as shown in FIG. 8, the FOV of the other sub-system 105 could be "six" (6), in which case the data communication receiver 115 treats Frame 11 as if it were the base frame.

In communication sub-systems in which the geographic areas of different service providers overlap, the data communication receiver 115 can sometimes be located in regions in which signals transmitted by the providers are both capable of being received. In such a situation, the data communication receiver 115 could easily miss messages if it was scheduled to wake in the same frames for each sub-system. According to the present invention, therefore, the FOVs of overlapping sub-systems 105 are different so that the data communication receiver 115 is conveniently assigned to wake during different frames for each overlapping sub-system 105. In other words, when the data communication receiver 115 wakes in Frame 7 (FIG. 7) of a first overlapping sub-system and does not locate a matching SSID, there is still time for the data communication receiver 115 to wake in Frame 11 (FIG. 8) of a second overlapping sub-system to check for the presence of a matching SSID. In this manner, the data communication receiver 115 is advantageously able to check all signals within range, i.e., signals transmitted by all overlapping sub-systems having geographic areas in which the data communication receiver 115 is located, within a single collapse cycle. As a result, the likelihood of missing messages is minimized.

Furthermore, messages for a data communication receiver 115 could be transmitted in more than one sub-system 105. For example, messages could be transmitted in overlapping sub-systems 105 having coverage areas in which the data communication receiver 115 is roaming. In such a case, the frame offsetting feature of the present invention allows the receiver 115 to wake in a first frame to receive messages in the first sub-system 105, while waking in a second frame to receive other messages in the second sub-system 105. The receiver 115 can therefore conveniently receive all messages transmitted by all different sub-systems 105 within a single collapse cycle.

FIG. 9 depicts an example of a wake cycle of the data communication receiver 115 when it has roamed into a remote, or non-overlapping, communication sub-system 105. Because the remote sub-system 105 does not share a coverage area with the local sub-system 105 of FIG. 6, the FOV can equal "zero" (0). In other words, the data communication receiver 115 can, in the remote sub-system 105, be assigned to wake during a substitute frame that is equivalent to the base frame.

According to the present invention, a sub-system 105 should not share the same FOV with other sub-systems 105 that have overlapping coverage areas. However, a first sub-system 105 can utilize the same FOV as any other sub-system 105 that does not have an overlapping coverage area with the first sub-system 105. This arrangement conveniently minimizes the chances of missed messages by the data communication receiver 115. At the same time, the availability of enough different FOVs is ensured so that the data communication receiver 115 can wake to receive all signals transmitted in its location within a single collapse cycle.

Figure 10:
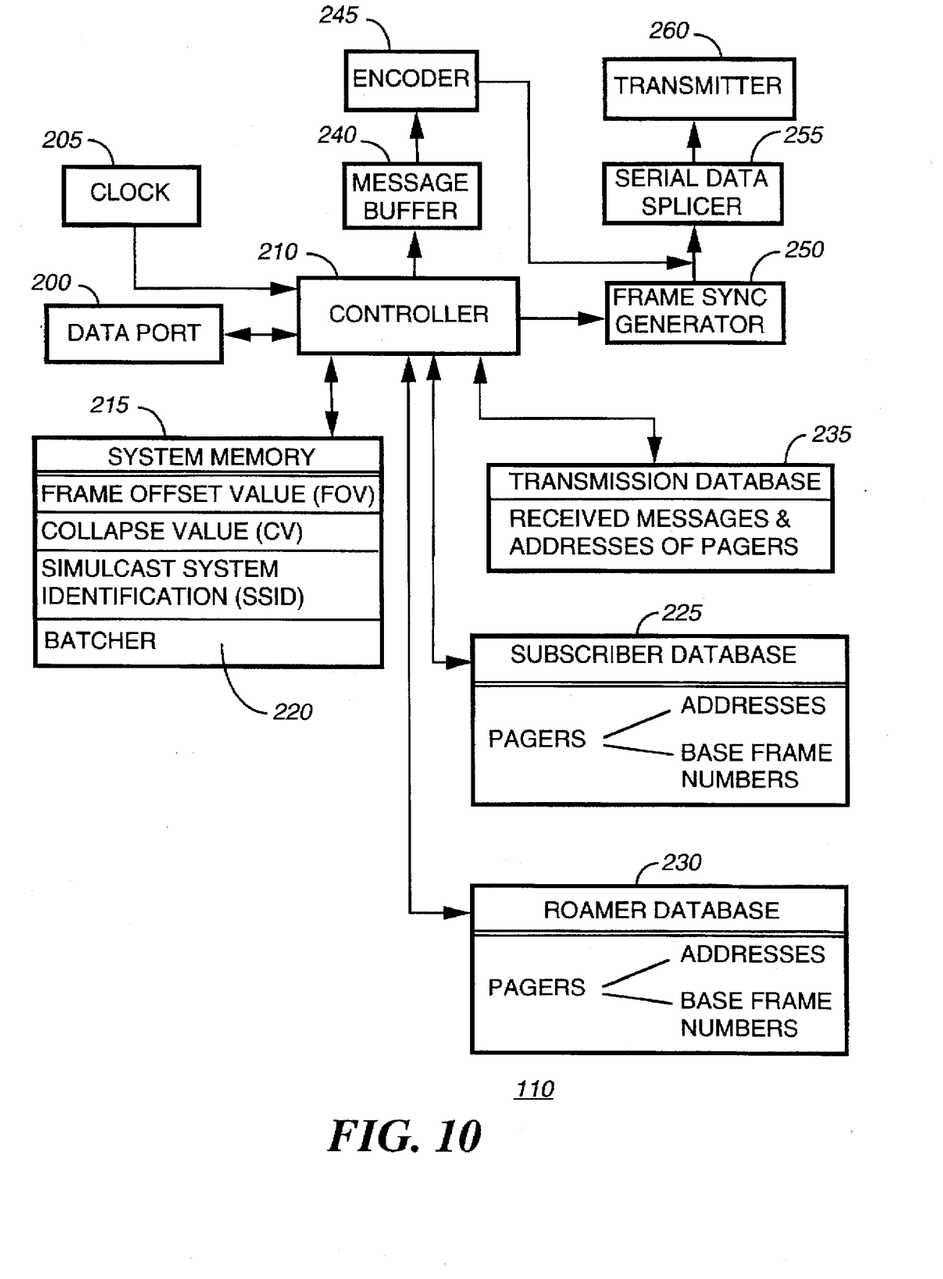
FIG. 10 is an electrical block diagram of a message transmission device included in the communication system of FIG. 1 in accordance with the present invention.

FIG. 10 is an electrical block diagram of a message transmission device, such as a terminal 110, located within a communication sub-system 105 according to the present invention. The terminal 110 comprises a data port 200 for receiving information, such as messages for reception by data communication receivers 115 located within the coverage area of the sub-system 105 as well as addresses indicative of the recipient data communication receivers 115. Alternatively, the terminal 110 could include a modem, data entry device, or any other circuitry instead of or in addition to the data port 200. A controller 210 controls the operations of the terminal 110 and processes information received from the data port 200. The terminal 110 further includes a clock 205 for providing time values and a subscriber database 225 for storing information about sub-system subscribers. Such stored information can, for instance, comprise a list of all data communication receivers 115 subscribing to the sub-system 105, addresses corresponding to the data communication receivers 115, and base frame numbers to which the data communication receivers 115 are assigned.

Similarly, a roamer database 230 stores information about data communication receivers 115 that have roamed into the sub-system 105. This information preferably includes at least data communication receiver addresses and base frame numbers. Information about the roaming data communication receivers 115 can be determined in any number of conventional ways. For instance, a user of a data communication receiver 115 within the communication system 100 (FIG. 1) could call its local service provider to indicate that it will be roaming into another identified sub-system, in which case the local terminal could forward information to the other sub-system for storage thereby. Alternatively, a data communication receiver 115 could transmit self-identifying information for reception by a terminal associated with a sub-system in which the data communication receiver 115 is located. If the data communication receiver information has not already been stored in the subscriber database 225, the terminal 110 could store the information in its roamer database 230. In such an embodiment, the terminal 110 would include receiving circuitry (not shown) for receiving the over-the-air transmissions from data communication receivers 115.

The terminal 110 further comprises a transmission database 235 for storing received messages and addresses of data communication receivers 115 to which the messages are to be transmitted. A system memory 215 stores system information that preferably comprises an FOV for use by roaming data communication receivers 115 and an SSID that identifies the sub-system 105. The collapse value is also stored. Additionally, a batcher 220 is stored for batching information for transmission by the terminal 110.

Preferably, the controller 210 gathers information to be transmitted during each frame into block information, address, vector, and message fields according to the FLEX™ protocol. The information is then coupled to a message buffer 240 for temporarily storing the information until a time for further processing and transmission. Frames are transmitted in numeric sequence, so that while a current frame is being transmitted, the next frame to be transmitted is in the message buffer 240, and the next frame thereafter is being gathered by the controller 210. At the appropriate time, the information stored in the message buffer 240 is transferred to the encoder 245 for encoding the information according to a conventional signalling format.

The controller 210 next enables a frame sync generator 250 to generate the predetermined synchronization (sync) patterns transmitted at the start of each frame transmission. The sync patterns are multiplexed with the encoded information by the serial data splicer 255, which generates a message stream. The message stream is transmitted by a transmitter 260 over a radio communication channel for reception by data communication receivers 115 in the communication sub-system 105.

As mentioned, the terminal 110 transmits the same FOV to all roaming data communication receivers 115 within the sub-system 105. As a result, the terminal 110 does not have to keep up with different offset values for each different roamer. Additionally, the FOV need not be programmed into each data communication receiver 115. As a result, valuable memory space is made available in the data communication receivers 115, which are generally small, portable devices in which memory space is limited. Furthermore, the FOV can be advantageously changed at any time without impacting the roamers. For example, if the coverage area of first sub-system 105 is expanded so that it overlaps with a second sub-system 105 using the same FOV, the FOV of one of the sub-systems 105 can easily be changed so that roamers can receive information of both sub-systems 105 within a single collapse cycle.

The FOV according to the present invention is independent of system features such as frequency and can therefore be changed at any time. Also, the FOV can be optimally chosen so that it does not conflict with the FOVs of overlapping sub-systems 105, thereby allowing roaming data communication receivers 115 to conveniently receiving messages from different sub-systems 105 within a single collapse cycle.

Figure 11:
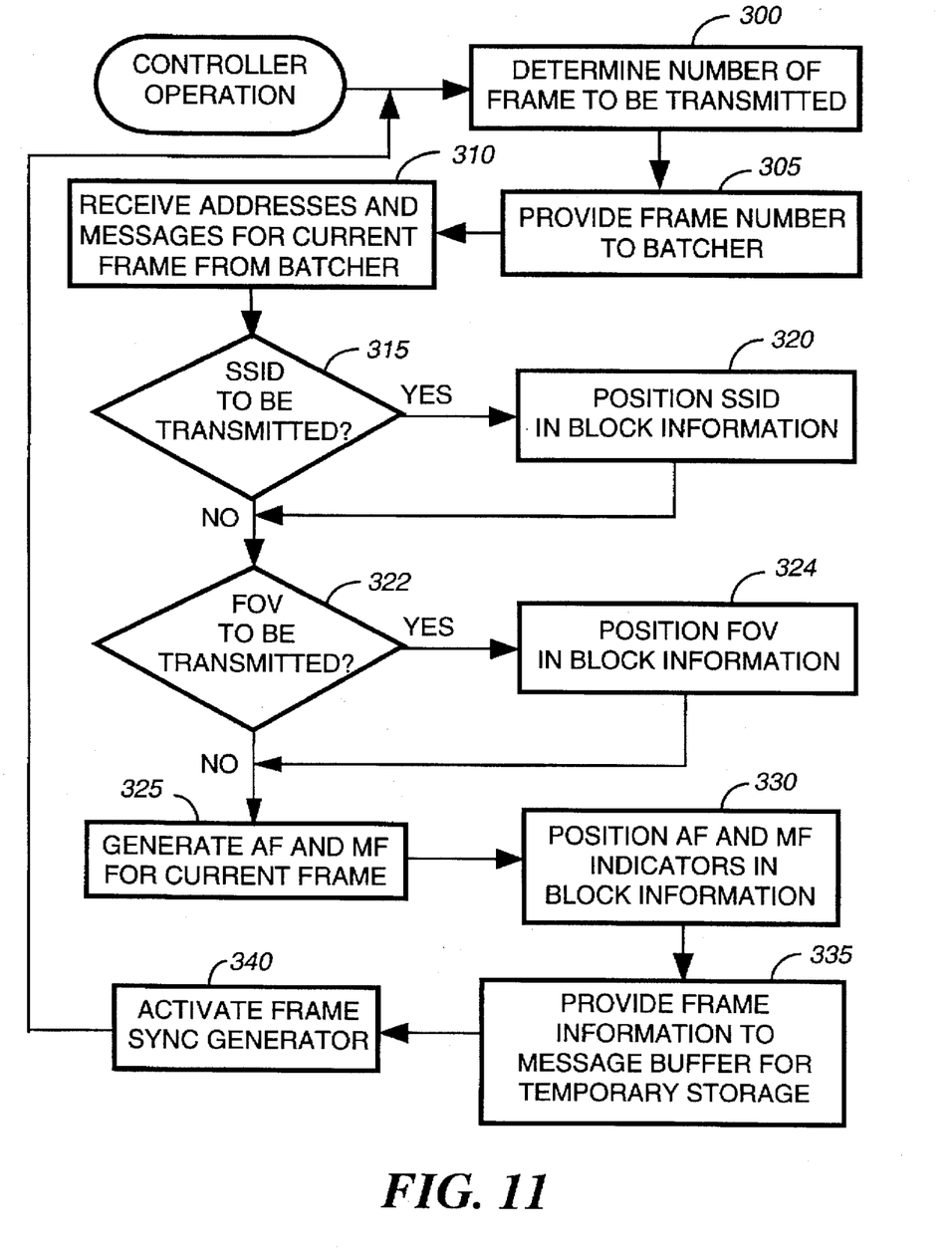
FIG. 11 is a flowchart depicting an operation of a controller included in the message transmission device of FIG. 10 in accordance with the present invention.

Referring next to FIG. 11, a flowchart depicts an operation of the terminal controller 210 according to the present invention. At step 300, the controller 210 determines the number of the frame to be transmitted. Then, at step 305, the frame number is provided to the batcher 220, from which addresses and messages to be transmitted are received, at step 310. At step 315, the controller 210 determines whether the SSID is to be transmitted in the current frame. When, at step 315, the SSID is to be transmitted, the SSID is positioned, at step 320, in the block information. When, at step 322, the FOV is to be transmitted, the FOV is positioned, at step 324, in the block information. Although it is preferred that the SSID and FOV be transmitted during the same frames, this is not necessary. Instead, the SSID and FOV could be transmitted in different frames in alternative embodiments of the present invention. Also, as mentioned above, the SSID and FOV could be transmitted only in selected frames. When the SSID and FOV are transmitted in every frame, steps 315 and 322 can be omitted.

Next, at step 325, the address field (AF) and message field (MF) are generated for the current frame. AF and MF start indicators are next positioned in the block information, at step 330. Thereafter, the frame information is provided, at step 335, to the message buffer 240 for temporary storage, and the frame sync generator 250 is activated, at step 340.

Figure 12:
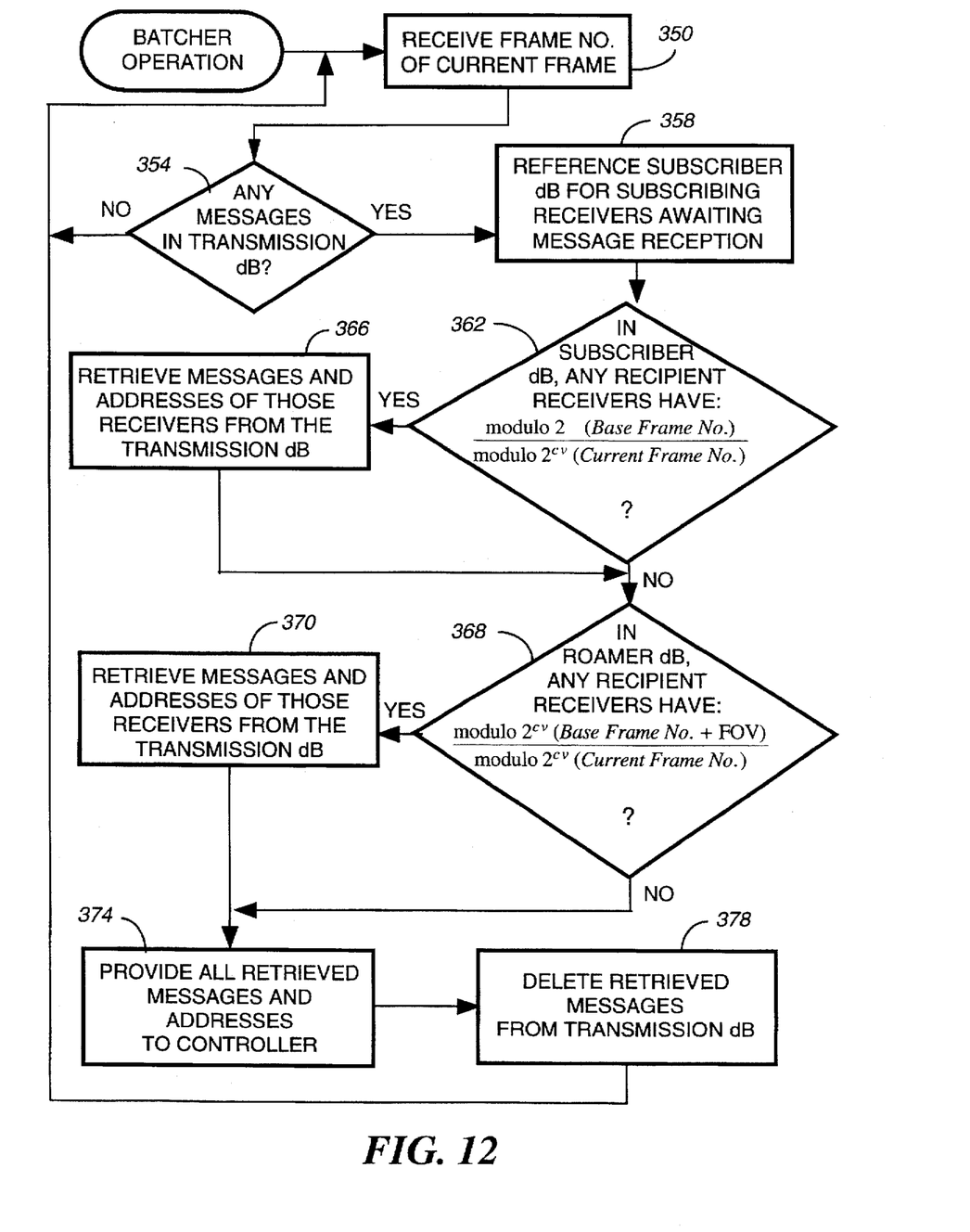
FIG. 12 is a flowchart of an operation of a batcher included in the message transmission device of FIG. 10 in accordance with the present invention.

FIG. 12 is a flowchart of an operation of the batcher 220. At step 350, the batcher 220 receives the frame number of the current frame and determines, at step 354, whether any messages are stored in the transmission database 235. When messages are stored for transmission, the subscriber database 225 is referenced, at step 358, to locate addresses of recipient receivers 115. At step 362, the batcher 220 determines whether any of the recipient data communication receivers 115 located in the subscriber database 225 are scheduled to receive messages in the current frame. Specifically, the batcher 220 determines whether any recipient data communication receivers 115 in the subscriber database 225 have base frame numbers that satisfy the following equation:

$$\frac{\text{modulo } 2^{cv} \text{ (Base Frame No.)}}{\text{modulo } 2^{cv} \text{ (Current Frame No.)}} = 1. \tag{4}$$

When a recipient data communication receiver 115 having an address found in the subscriber database 225 is assigned to wake in the current frame, the messages and addresses of those data communication receivers 115 are retrieved, at step 366, from the transmission database 235.

At step 368, the batcher 220 determines whether any of the recipient data communication receivers 115 located in the roamer database 230 are scheduled to receive messages in the current frame. Specifically, the hatcher 220 determines whether any recipient data communication receivers 115 in the roamer database 230 have base frame numbers that satisfy the following equation:

$$\frac{\text{modulo } 2^{cv} \text{ (Base Frame No.} + FOV)}{\text{modulo } 2^{cv} \text{ (Current Frame No.)}} = 1. \tag{5}$$

When a recipient data communication receiver 115 having an address found in the roamer database 230 is assigned to wake in the current frame, the messages and addresses of those data communication receivers 115 are retrieved, at step 370, from the transmission database 235. All retrieved messages and addresses are then provided, at step 374, to the controller 210. The retrieved messages and addresses can be deleted, at step 378, from the transmission database 235.

In this manner, the messages for non-roaming, i.e., local, data communication receivers 115 are transmitted during the base frame of each data communication receiver 115 and during the multiples thereof indicated by the collapse cycle. For roaming data communication receivers 115, however, the messages are transmitted during the substitute frame of each data communication receiver 115 according to the present invention.

Figure 13:
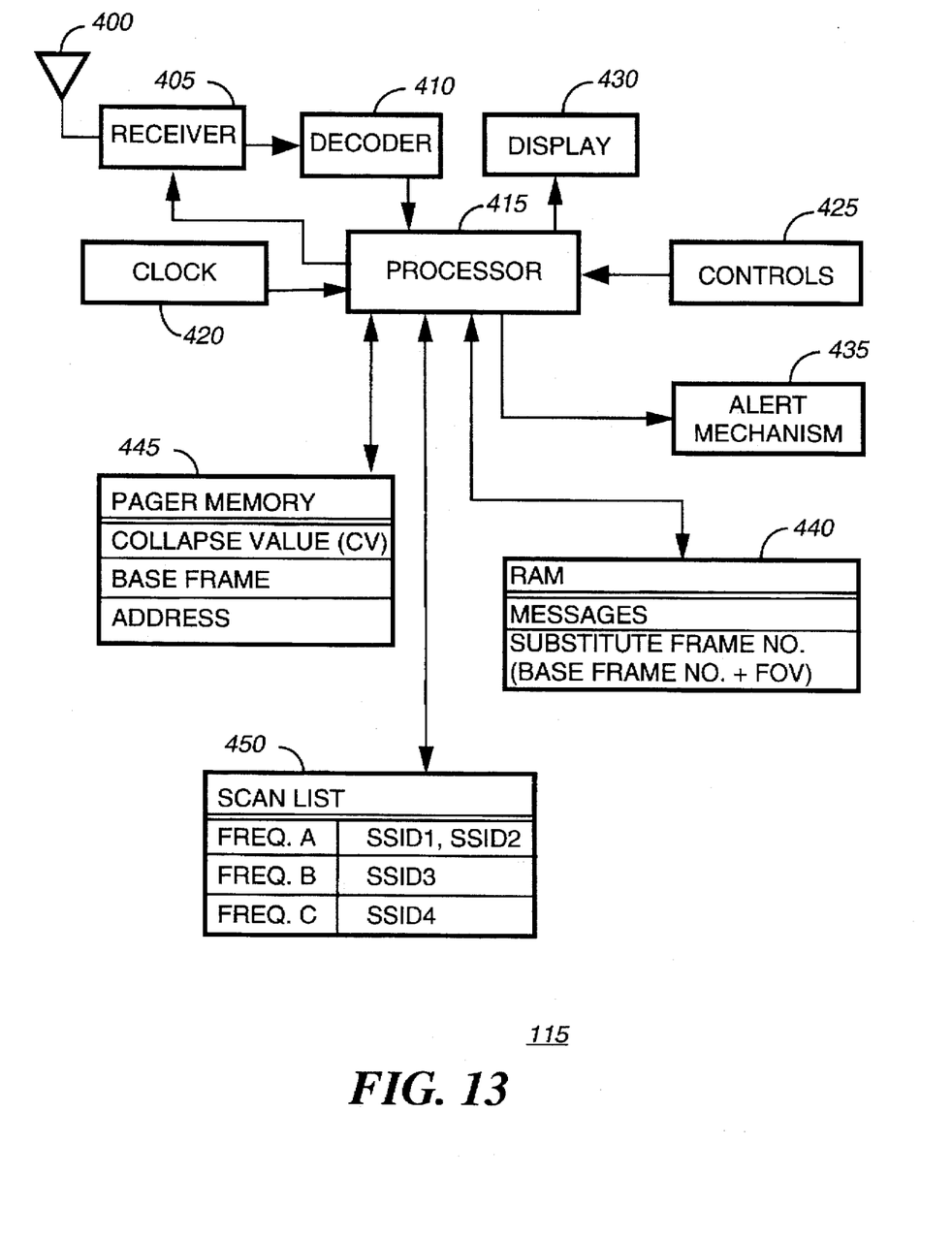
FIG. 13 is an electrical block diagram of a data communication receiver included in the communication system of FIG. 1 in accordance with the present invention.

FIG. 13 is an electrical block diagram of a data communication receiver 115 according to the present invention. The data communication receiver 115 comprises an antenna 400 for receiving RF signals within the communication system 100 (FIG. 1). A receiving circuit 405 is coupled to the antenna 400 for demodulating the RF signal, and a decoder 410 decodes the signal to recover data symbols included therein. A processor 415 coupled to the decoder 410 processes the data symbols for temporary storage in a memory such as a random access memory (RAM) 440. The RAM 440 can also be used to store the substitute frame number computed with reference to the FOV.

The processor 415 enables and disables the receiving circuit 405 according to battery saving techniques by enabling the receiving circuit 405 during the base frame and multiples thereof as determined by the collapse value when the data communication receiver 115 is located in its local sub-system 105. When the data communication receiver 115 is roaming, the processor 415 enables the receiving circuit 405 during the substitute frame, rather than the base frame, and multiples of the substitute frame determined by the collapse value. The processor 415 conventionally determines the frame number by enabling the receiving circuit 405 to receive a "frame number indication" at specific times, such as at power up of the data communication receiver 115. Thereafter, the processor 415 can determine when to wake and sleep by referencing a clock 420 and the collapse value.

The data communication receiver 115 also comprises a pager memory 445 for storing data communication receiver information, such as the collapse value, the base frame to which the data communication receiver 115 is assigned, and the address of the data communication receiver 115. It will be appreciated that the collapse value could be periodically transmitted by the terminal 110 rather than stored by the data communication receiver 115. A scan list 450 is further included in the data communication receiver 115 for storing roaming information, such as a list of SSIDs indicative of sub-systems 105 into which the data communication receiver 115 can roam and frequencies on which the sub-systems 105 transmit information.

Also included in the data communication receiver 115 are controls 425 for receiving user-initiated signals that are provided to the processor 415. A display 430 coupled to the processor 415 displays messages, and an alert mechanism 435 generates an alert, such as an audible tone, in response to activation by the processor 415.

Figure 14:
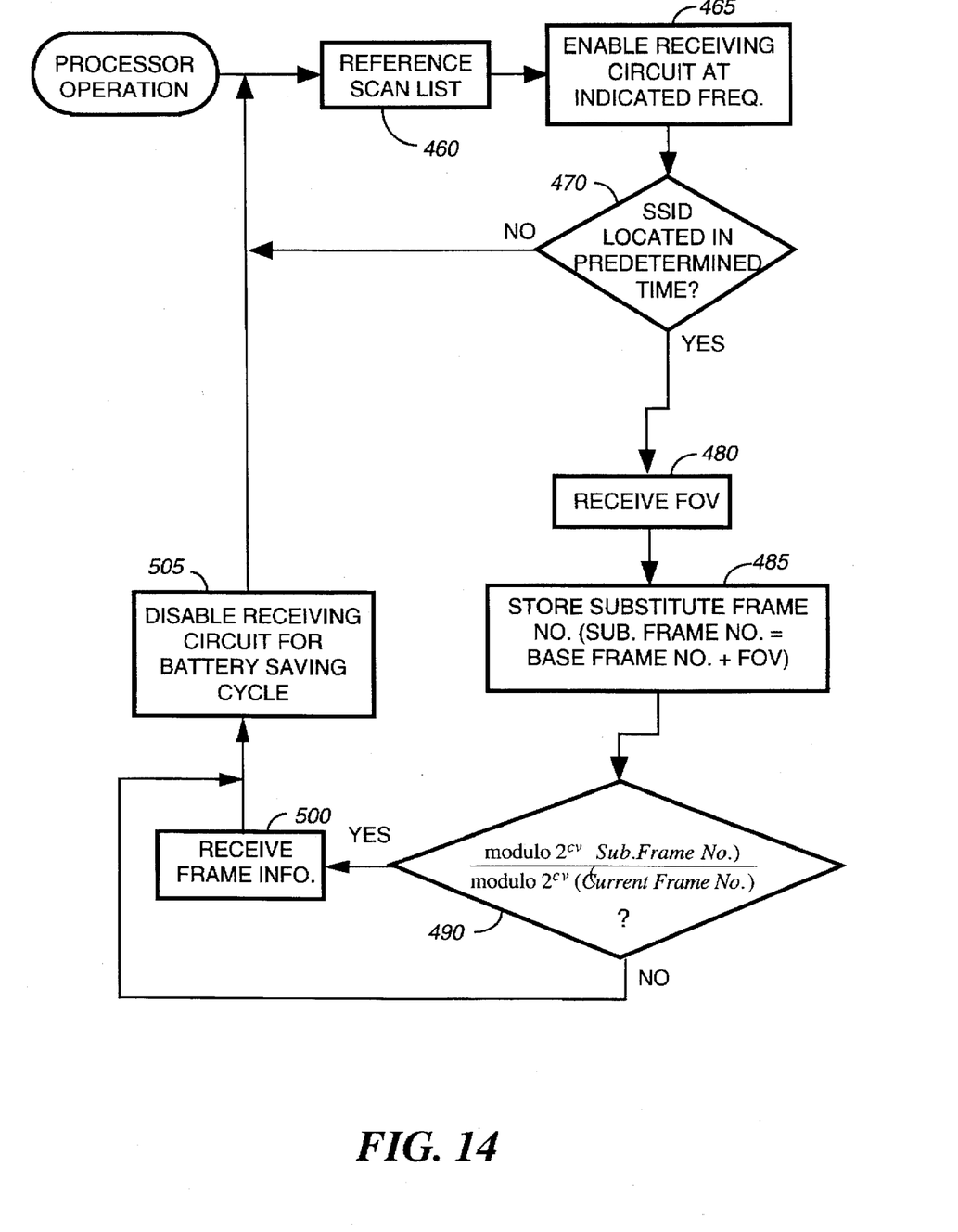
FIG. 14 is a flowchart of an operation of a processor included in the data communication receiver of FIG. 13 in accordance with the present invention.

FIG. 14 is a flowchart of an operation of the processor 415 according to the present invention. At step 460, the processor 415 references the scan list 450 to determine the frequency to which the receiving circuit 405 should be tuned. The receiving circuit 405 is enabled, at step 465, to receive the indicated frequency. When the SSID associated with the tuned frequency is not received, at step 470, within a predetermined time, processing resumes at step 460 to scan other frequencies. When the SSID is located, i.e., when the signal is valid, the FOV is received, at step 480, and the substitute frame number is calculated according to equation (3) above. It will be appreciated that, although the substitute frame number is described as arrived at by adding the FOV and the base frame number, other relationships between the base frame number and the substitute frame number are equally as effective in implementing the frame offset according to the present invention. For instance, the FOV could be subtracted from the base frame number or twice the FOV could be added to the base frame number. It is important only that the substitute frame number have a relationship with the base frame number that is denoted by the FOV.

At step 485, the substitute frame number is stored in the RAM 440. It will be appreciated that, after calculation of the substitute frame number, the FOV need not be received each time the receiver 115 wakes for signal reception. The processor 415 then operates the data communication receiver 115 to receive messages during its substitute frame.

Specifically, the processor 415 determines, at step 490, whether the current frame number satisfies the following equation:

$$\frac{\text{modulo } 2^{cv} \text{ (Sub. Frame No.)}}{\text{modulo } 2^{cv} \text{ (Current Frame No.)}} = 1. \qquad (6)$$

When equation (6) is satisfied, the receiving circuit 405 is enabled to receive information in the current frame, at step 500. Thereafter, at step 505, the receiving circuit 405 is disabled for battery saving during frames that do not have numbers satisfying equation (6).

In summary, the communication system as described above includes sub-systems supporting roaming by data communication receivers located in the communication system. Each data communication receiver is assigned a base frame during which it is assigned to wake from battery saving to receive messages. When the data communication receiver is located in a local sub-system, i.e., one in which it normally receives messages, it wakes during its base frame and multiples thereof indicated by a collapse value. When the data communication receiver is located in another sub-system into which it has roamed, however, it does not necessarily wake during its base frame. Instead, it receives a frame offset value transmitted by the sub-system into which it has roamed. The frame offset value defines a relationship between the base frame and another frame, i.e., a substitute frame, the number of which is calculated using the frame offset value. The data communication receiver then treats the substitute frame as if it were the base frame while located in the new sub-system. In other words, the data communication receiver wakes during the substitute frame, rather than the base frame.

According to the present invention, the frame offset value is different for sub-systems that have overlapping coverage areas. Therefore, when a data communication receiver is located in the overlapping region, it can scan the radio channels of both sub-systems within a single collapse cycle, conveniently minimizing the likelihood of missed messages. Sub-systems with non-overlapping coverage areas can have the same frame offset values, thus ensuring the availability for an adequate number of frame offset values defining substitute frames within a single collapse cycle.

An advantage of the present invention is that the frame offset value is stored by message transmission devices within the communication sub-systems rather than by the data communication receivers. Therefore, limited memory space is not consumed unnecessarily in the data communication receivers, which usually have size-constraints. Furthermore, the frame offset values can be changed without impacting operations of the data communication receivers.

It will be appreciated by now that there has been provided a method and apparatus for providing roaming instructions to data communication receivers.

What is claimed is:

1. A method, in a communication system, for transmitting a signal containing roaming instructions to a data communication receiver, the signal comprising frames of data, the data communication receiver having a memory for storing a base frame number associated with a base frame during which the data communication receiver is assigned to wake for message reception, the method comprising the steps of:

batching information into a frame of data, wherein the frame comprises frame offset information for reception by the data communication receiver, the frame offset information indicating a substitute frame that is relative in location to the base frame and that is located within the signal received by the data communication receiver, wherein the data communication receiver is thereafter wake for message reception in the substitute frame rather than the base frame; and transmitting, within a predetermined geographic area, the information on a radio communication channel.

2. The method of claim 1, wherein the batching and transmitting steps occur in a message transmission device included in the communication system, and wherein the method further comprises, in the message transmission device, the steps of:

determining that the data communication receiver is roaming; and batching and transmitting messages for the data communication receiver in the substitute frame rather than the base frame.

3. The method of claim 2, further comprising, in the data communication receiver, the steps of:

receiving the frame offset information, wherein the frame offset information comprises a value;

computing a substitute frame number by adding the value to the base frame number, the substitute frame number associated with the substitute frame; and storing the substitute frame number.

4. The method of claim 3, further comprising, in the data communication receiver, the steps of:

enabling, subsequent to the storing step, a receiving circuit included in the data communication receiver to receive a currently transmitted frame of data;

determining a frame number associated with the currently transmitted frame;

receiving information included in the currently transmitted frame when the frame number is equivalent to the substitute frame number; and disabling the receiving circuit when the frame number is not equivalent to the substitute frame number.

5. The method of claim 2, further comprising, in the message transmission device, the steps of:

receiving messages for transmission to another data communication receiver that is determined to be a local data communication receiver; and batching and transmitting the messages for the local data communication receiver in a base frame assigned to the local data communication receiver.

6. A communication system for providing roaming instructions in a signal comprising frames of data, the communication system comprising:

a message transmission device for batching information into a frame of data and transmitting, within a predetermined geographic area, the information on a radio communication channel, the frame comprising frame offset information for reception by roaming receivers; and a data communication receiver located within the predetermined geographic area for receiving the information, wherein the data communication receiver stores a base frame number associated with a base frame during which the data communication receiver is assigned to wake for message reception, wherein the frame offset information is indicative of a substitute frame that is relative in location to the base frame and that is located within the signal received by the data communication receiver, and wherein the data communication receiver is to wake for message reception thereafter in the substitute frame rather than the base frame.

7. The communication system of claim 6, wherein the message transmission device comprises:

determining means for determining that the data communication receiver is roaming;

a batcher coupled to the determining means for batching messages for the data communication receiver in the substitute frame rather than the base frame; and a transmitter coupled to the batcher for transmitting the messages during the substitute frame.

8. The communication system of claim 7, wherein the frame offset information comprises a value, and wherein the substitute frame is associated with a substitute frame number calculated by adding the value to the base frame number.

9. The communication system of claim 8, wherein the data communication receiver comprises:

a receiving circuit for receiving the frame offset information;

a processor coupled to the receiving circuit for adding the value to the base frame number to compute a substitute frame number associated with the substitute frame; and a memory coupled to the processor for storing the substitute frame number.

10. The communication system of claim 9, wherein the data communication receiver further comprises:

means for enabling the receiving circuit for message reception during the substitute frame rather than the base frame; and means for disabling the receiving circuit during frames other than the substitute frame.

11. The communication system of claim 6, wherein the frames of the signal include block information in which frame structure information is located, an address field in which addresses of recipient receivers are located, and a message field in which messages intended for reception by the recipient receivers are located.

12. The communication system of claim 11, wherein the block information of selected frames of the signal includes the frame offset information.

13. The communication system of claim 12, wherein the communication system is associated with a simulcast system identification (SSID) transmitted during the selected frames.

14. A data communication receiver for receiving roaming instructions, the data communication receiver comprising:

a receiving circuit for receiving a signal comprising frames of data, the signal containing frame offset information;

a memory coupled to the receiving circuit for storing a base frame number associated with a base frame during which the data communication receiver is assigned to wake for message reception; and a processor coupled to the memory for computing a substitute frame number from the frame offset information, wherein the substitute frame number is associated with a substitute frame that is relative in location to the base frame and that is located within the signal received by the data communication receiver, and wherein the data communication receiver is to wake for message reception thereafter in the substitute frame rather than the base frame.

15. The data communication receiver of claim 14, wherein the frame offset information comprises a value, and wherein the substitute frame number is calculated by adding the value to the base frame number.

16. The data communication receiver of claim 14, further comprising:

means for enabling the receiving circuit for message reception during the substitute frame rather than the base frame; and means for disabling the receiving circuit during frames other than the substitute frame.

17. The data communication receiver of claim 14, wherein the frames of the signal include block information in which frame structure information is located, an address field in which addresses of recipient receivers are located, and a message field in which messages intended for reception by the recipient receivers are located.

18. A message transmission device for providing, within a predetermined geographic area, a signal that contains roaming instructions and that comprises frames of data, the message transmission device comprising:
- a memory for storing frame offset information for provision to data communication receivers;
- a database for storing base frame numbers associated with base frames in which the data communication receivers are assigned to receive messages;
- a batcher coupled to the memory for hatching the frame offset information into a frame of data; and
- a transmitter coupled to the batcher for transmitting the frame including the frame offset information, wherein the frame offset information indicates substitute frames that are relative in location to base frames of the data communication receivers and that are located within the signal received by the data communication receivers, and wherein roaming receivers of the data communication receivers are to thereafter wake for message reception in the substitute frames rather than the base frames of the roaming receivers.

19. The message transmission device of claim 18, wherein the frames of the signal include block information in which frame structure information is located, an address field in which addresses of recipient receivers are located, and a message field in which messages intended for reception by the recipient receivers are located.

20. The message transmission device of claim 19, wherein the block information of selected frames of the signal includes the frame offset information.

* * * * *